Oct. 1, 1963 T. J. DIAMOND 3,105,401

THREE-WAY PIPE FITTING TOOL

Filed March 20, 1962

INVENTOR.
THOMAS J. DIAMOND
BY *L. S. Saulsbury*
ATTORNEY.

United States Patent Office 3,105,401
Patented Oct. 1, 1963

3,105,401
THREE-WAY PIPE FITTING TOOL
Thomas J. Diamond, M.D. 15, Fern Ave.,
Winona Lake, Newburgh, N.Y.
Filed Mar. 20, 1962, Ser. No. 181,127
1 Claim. (Cl. 81—1)

This invention relates to a unique design of a tool for protecting soft metal pipe fittings during installation or removal, and characterized by a compact geometry which provides protective anti-collapsing plug members for three different sizes of fittings.

In the pipe fitting art, it is common to provide adapter hardware for making the transition from ducting having tapered pipe threads for its couplings or terminations to ducting having soldered, cemented, or clamped couplings or terminations. For instance, adapters are available for "copper to iron" transitions which comprise a short length of brass hexagonal tubing internally bored at one end to receive a given diameter of cylindrical copper tubing so that it may be soldered therein, and externally threaded with pipe threads at the other end so that it may be screwed into a mating female pipe fitting by applying a wrench to the remaining hexagonal mid section.

During the latter screwing installation or removal, it frequently happens that the pressure of the wrench causes the smooth cylindrical portion of the adapter either to partially collapse or to become distorted so that subsequent mating and soldering of the copper tubing or pipe thereto becomes difficult or impossible.

The present invention obviates the possibility of such collapse or distortion by internally supporting the bore of the smooth portion of such adapters or analogous fittings during their installation or removal. In addition, the novel design taught by this device permits the inexpensive manufacture and assembly of a convenient three-way unit which in a compact space affords protective support for three different sizes of adapter fixtures.

It is the principal object of the present invention to provide a low cost, compact tool for protecting three different sizes of soft metal pipe fittings from damage during installation or removal.

It is another object of the present invention to provide a design of tool achieving the foregoing object and at the same time being largely capable of easy assembly from simple screw machine parts.

It is still another object to provide a geometry of tool design which minimizes the bulk of a three-way adapter protector.

Figure 1:
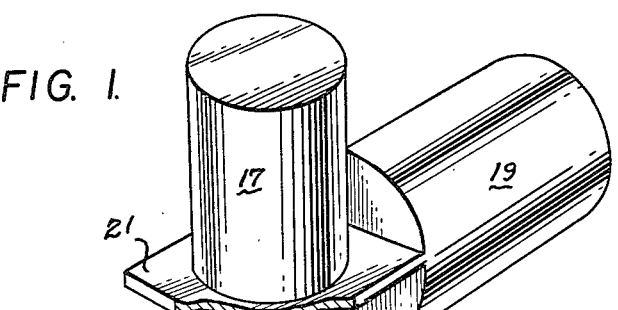
Figure 2:
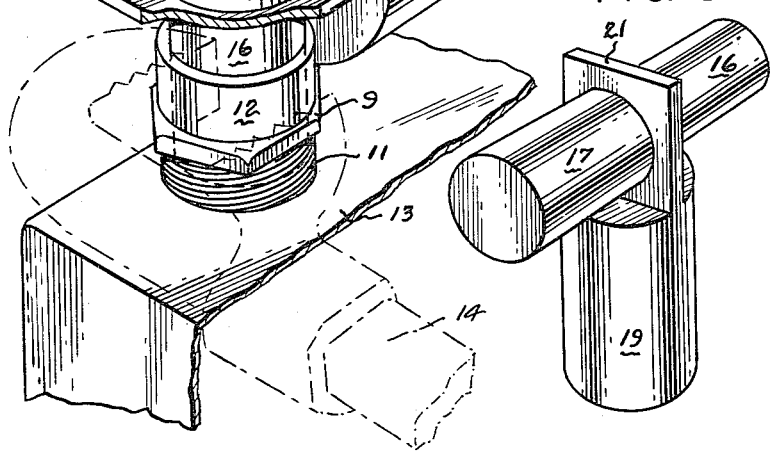
Figure 3:
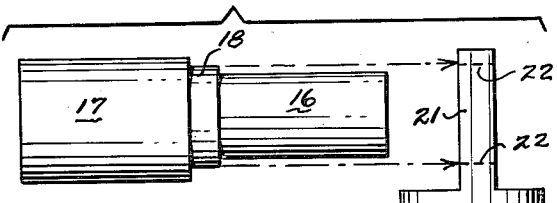
Figure 4:
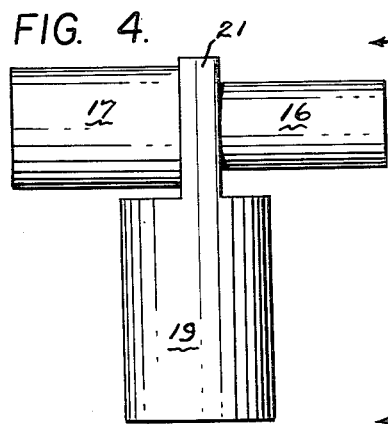
Figure 5:
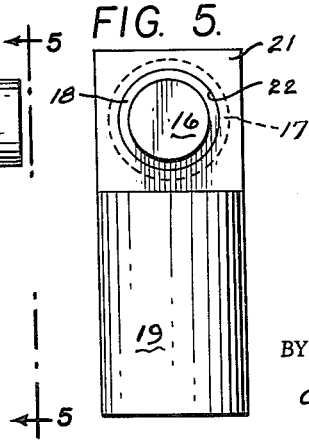

For other objects and a better understanding of the present invention, reference may be had to the following detailed description taken in connection with the accompanying drawing, in which:

FIGURE 1 is a perspective view of the fitting tool shown in use while protecting an adapter from the pressures of a wrench, parts being shown broken away, FIG. 2 is a perspective view of the fitting tool unobscured by pipe fittings, FIG. 3 is an exploded elevational view showing the assembly procedure of its two basic parts, FIG. 4 is an assembled elevational view of the tool, and FIG. 5 is an end elevational view as seen from line 5—5 of FIG. 4.

Referring now to the drawings, it may be seen in FIG. 1 that an adapter soft metal fitting 9 having pipe threads 11 and a smooth bore section 12 is being screwed into a female threaded housing 13 or a pipe coupling by means of a wrench 14. During the foregoing installation, the smooth bore section 12 of the soft metal brass adapter 9 is being protected from collapse or distortion by the presence of a cylindrical metal plug 16, FIG. 1, which is part of the subject tool, and is dimensioned to be a push fit into the minimum specified internal diameter of smooth bore section 12 of the fitting 9. Plug 16 is one of two shoulders machined from the larger cylindrical plug member 17. A third shoulder 18, FIG. 3, is machined from the plug member 17 and is intermediate in diameter between the diameters of protective plugs 16 and 17. Shoulder 18 thus comprises a cylindrical bushing secured to both plug 16 and plug 17.

A third protective cylindrical plug tool 19 is provided at one end with a web member 21 which is machined integrally from plug 19 by milling. Web 21 thus comprises a flat longitudinal extension of plug 19. Web member 21 lies in a plane parallel to the axis of cylinder 19 and is provided with a hole 22, FIG. 3, whose diameter is an interference fit with shoulder 18 of plug 17, over which it is assembled by pressing as indicated in FIG. 3.

The operation of the assembled subject device as seen in FIG. 2 comprises the selection of the appropriate plug 16, 17, or 19 and its insertion in the adapter 9 or other fitting, to be protected. Wrench 14 or equivalent may then be applied with assurance that the smooth bore section 12 of the fitting 9 will not be distorted or collapsed.

While various changes may be made in the detailed construction, it shall be understood that such changes shall be within the spirit and scope of the invention as defined by the appended claim.

What is claimed is:

A tool assembly for use with deformable tubular fittings to prevent deformation thereof, said assembly consisting of an elongated solid cylindrical member of a certain diameter having flat ends, one end having a diametrical plate projecting in alignment with the axis of the body of the cylindrical member, said plate having a central hole therein, constituting a bearing, and another elongated solid cylindrical member supported in said bearing transversely of said first cylindrical member, said other elongated cylindrical member having ends of varying diameters and with a different diameter midway its ends fitted in said bearing, said first cylindrical member and said ends of the other cylindrical member having varying diameters and constituting three plug members disposed at different directions, adapted to be inserted into tubular fittings having different bore diameters, said plug members also constituting handles for insertion of a selected plug member into a tubular fitting.

References Cited in the file of this patent

UNITED STATES PATENTS

| | | |
|---|---|---|
| 817,695 | Dukerschien et al. | Apr. 10, 1906 |
| 1,185,160 | Allen | May 30, 1916 |
| 1,883,692 | Gillin | Oct. 18, 1932 |
| 2,903,797 | Porter | Sept. 15, 1959 |